(12) United States Patent
Tomita et al.

(10) Patent No.: US 12,173,770 B2
(45) Date of Patent: Dec. 24, 2024

(54) DAMPER DEVICE

(71) Applicant: EXEDY Corporation, Neyagawa (JP)

(72) Inventors: Atsushi Tomita, Neyagawa (JP);
Kotaro Miyauchi, Neyagawa (JP);
Takeshi Senoue, Neyagawa (JP)

(73) Assignee: EXEDY Corporation, Osaka (JP)

( * ) Notice: Subject to any disclaimer, the term of this patent is extended or adjusted under 35 U.S.C. 154(b) by 587 days.

(21) Appl. No.: 17/455,082

(22) Filed: Nov. 16, 2021

(65) Prior Publication Data

US 2022/0186785 A1   Jun. 16, 2022

(30) Foreign Application Priority Data

Dec. 16, 2020   (JP) .................................. 2020-208343

(51) Int. Cl.
*F16F 15/129* (2006.01)
*F16F 15/123* (2006.01)

(52) U.S. Cl.
CPC .... *F16F 15/1292* (2013.01); *F16F 15/12353* (2013.01)

(58) Field of Classification Search
CPC ............. F16F 15/12353; F16F 15/1236; F16F 15/129; F16F 15/1292; F16F 15/1295;
(Continued)

(56) References Cited

U.S. PATENT DOCUMENTS 3,091,949 A * 6/1963 Sink ...................... F16F 15/123
464/68.41

4,557,702 A * 12/1985 Takeuchi ............ F16F 15/1238
464/68.41

(Continued)

FOREIGN PATENT DOCUMENTS

EP   3680512 A1   7/2020
FR   2894003 A1 *  6/2007   ............ F16F 15/129

(Continued)

OTHER PUBLICATIONS

Notice of Rejection dated Mar. 19, 2024, issued in connection with corresponding Japanese Patent Application.

(Continued)

*Primary Examiner* — Josh Skroupa
(74) *Attorney, Agent, or Firm* — United IP Counselors, LLC

(57) ABSTRACT

A damper device includes a first rotor, a second rotor rotatable relative to the first rotor, a plurality of elastic members circumferentially aligned, an intermediate member, and a hysteresis generating mechanism. The intermediate member is disposed axially between the first rotor and the second rotor. The hysteresis generating mechanism is disposed axially between the first rotor and the second rotor to generate a hysteresis torque in relative rotation between the first rotor and the second rotor. The intermediate member includes an annular portion and a support portion. The annular portion is provided radially outside the plurality of elastic members. The support portion protrudes radially inward from the annular portion. The support portion is disposed between at least circumferentially adjacent two of the plurality of elastic members. The support portion actuates the at least circumferentially adjacent two of the plurality of elastic members in series.

7 Claims, 5 Drawing Sheets

(58) Field of Classification Search
CPC ........... F16F 15/13469; F16F 15/13476; F16F 15/139; F16F 15/1392; F16F 15/1395
USPC .............................................. 464/68.4, 68.41
See application file for complete search history.

(56) References Cited

U.S. PATENT DOCUMENTS

| | | |
|---|---|---|
| 6,343,684 B1 | 2/2002 | Lohaus et al. |
| 7,971,696 B2 * | 7/2011 | Rohs ..................... F16F 15/139 192/214.1 |
| 8,795,092 B2 * | 8/2014 | Verhoog ............... F16F 15/129 464/68.4 |
| 9,360,081 B2 * | 6/2016 | Lee ................... F16F 15/13492 |
| 2009/0223771 A1 | 9/2009 | Masaki et al. |
| 2010/0139450 A1 | 6/2010 | Rohs |
| 2015/0362041 A1 | 12/2015 | Lee et al. |

FOREIGN PATENT DOCUMENTS

| | | |
|---|---|---|
| JP | 1985010928 U | 1/1985 |
| JP | 1998078045 | 3/1998 |
| JP | 2006226534 A | 8/2006 |
| JP | 2018-096534 A | 6/2018 |
| JP | 2018150956 A | 9/2018 |
| JP | 2020112201 A | 7/2020 |
| WO | 2006132101 | 12/2006 |

OTHER PUBLICATIONS

Notice of Rejection dated Aug. 20, 2024, issued in connection with corresponding Japanese Patent Application.

* cited by examiner

DAMPER DEVICE

CROSS-REFERENCE TO RELATED APPLICATIONS

This application claims priority to Japanese Patent Application No. 2020-208343 filed Dec. 16, 2020. The entire contents of that application are incorporated by reference herein in their entirety.

TECHNICAL FIELD

The present invention relates to a damper device.

BACKGROUND ART

A power transmission train for a vehicle is provided with a damper device for attenuating vibrations attributed to fluctuations in torque from a drive source. In general, the damper device is provided with an input rotor, an output rotor, a plurality of springs, and a hysteresis generating mechanism. The input rotor and the output rotor are rotatable relative to each other in a predetermined angular range. The springs elastically couple both the rotors in a rotational direction. The hysteresis generating mechanism generates a hysteresis torque in relative rotation between the input rotor and the output rotor. The hysteresis torque attenuates vibrations attributed to fluctuations in inputted torque.

Besides, increasing an angle at which the input rotor and the output rotor are rotatable relative to each other (maximum torsion angle), in other words, widening of angle is preferable for attenuating vibrations as much as possible in this type of damper device. In view of this, for instance, there has been produced such a type of damper device as described in Japan Laid-open Patent Application Publication No. 2018-96534. In the damper device described in Japan Laid-open Patent Application Publication No. 2018-96534, an intermediate plate is disposed axially between the input rotor and the output rotor. With the intermediate plate, at least two of the plural springs are actuated in series (this condition will be hereinafter simply referred to as "serialized"). Thus, it is intended to achieve the widening of angle.

A type of damper device, in which the plural springs are actuated in parallel, does not need such an intermediate plate as described in Japan Laid-open Patent Application Publication No. 2018-96534. Therefore, the type of damper device is designed such that the hysteresis generating mechanism is provided axially between a flange of the output rotor and each of a pair of plates composing the input rotor. Such hysteresis generating mechanism as configured herein is widely used in versatile damper devices. Hence, it is preferable for the hysteresis generating mechanism to be usable in a serialized type of damper device as well.

However, the hysteresis generating mechanism, used for the type of damper device in which the plural springs are actuated in parallel, is incompatible to the serialized type of damper device. This is because in the serialized type of damper device, the intermediate plate is provided axially between the flange of the output rotor and the plates composing the input rotor.

It is an object of the present invention to make a hysteresis generating mechanism, used for a type of damper device actuated in parallel, compatible to a serialized type of damper device.

BRIEF SUMMARY (1) A damper device according to the present invention includes a first rotor, a second rotor, a plurality of elastic members, an intermediate member, and a hysteresis generating mechanism. The second rotor is rotatable relative to the first rotor. The plurality of elastic members are circumferentially aligned and elastically couple the first rotor and the second rotor in a rotational direction. The intermediate member is disposed axially between the first rotor and the second rotor so as to be rotatable relative to the first rotor and the second rotor. The hysteresis generating mechanism is disposed axially between the first rotor and the second rotor and generates a hysteresis torque in relative rotation between the first rotor and the second rotor.

Besides, the intermediate member includes an annular portion and a support portion. The annular portion is provided radially outside the plurality of elastic members. The support portion is shaped to protrude radially inward from the annular portion, is disposed between at least circumferentially adjacent two of the plurality of elastic members, and actuates the at least circumferentially adjacent two of the plurality of elastic members in series.

In the present damper device, when a torque is inputted to the first rotor, for instance, the torque is transmitted to the second rotor through the plurality of elastic members. When the torque inputted to the first rotor fluctuates, the torque fluctuations are inhibited by the actuation of the plurality of elastic members and by the hysteresis generating mechanism, whereby vibrations are attenuated. Especially, at least two elastic members are actuated in series by the intermediate member. Hence, increase in torsion angle (widening of angle) is achieved, whereby the vibrations attributed to the torque fluctuations can be attenuated as much as possible.

The intermediate member herein includes the annular portion in an outer peripheral part of the damper device, i.e., in a part located radially outside the plurality of elastic members and supports adjacent elastic members by the support portion protruding radially inward from the annular portion. Therefore, it is not required to provide a portion composing part of the intermediate member in an inner peripheral part of the damper device, whereby a member, composing part of the hysteresis generating mechanism, can be disposed axially between the first rotor and the second rotor. In other words, the hysteresis generating mechanism, used for a type of damper device actuated in parallel, is compatible to a serialized type of damper device.

(2) Preferably, the hysteresis generating mechanism includes a friction member disposed axially between the first rotor and the second rotor. The friction member makes contact at a first axially lateral surface thereof with the first rotor, while making contact at a second axially lateral surface thereof with the second rotor.

Here, the friction member, composing part of the hysteresis generating mechanism, can be disposed between the first rotor and the second rotor. In other words, the hysteresis generating mechanism, used for the type of damper device actuated in parallel, can be utilized without any changes.

(3) Preferably, the first rotor includes a first input plate and a second input plate. The first and second input plates, each having a disc shape, are axially opposed to each other and are fixed to each other. In this case, the second rotor includes a flange disposed axially between the first input plate and the second input plate. On the other hand, the intermediate member includes a first intermediate plate and a second intermediate plate. The first intermediate plate is disposed axially between the first input plate and the flange. The second intermediate plate is disposed axially between the second input plate and the flange and is fixed to the first intermediate plate so as to be immovable with respect thereto in both axial and rotational directions.

In supporting the plurality of elastic members by the intermediate member, it is required to support axially middle parts of the plurality of elastic members. Now suppose the intermediate member is made of a single plate. To support the axially middle parts of the plurality of elastic members, it is herein inevitable that the intermediate member made of the single plate axially overlaps the second rotor. Because of this, when made of the single plate, the intermediate member cannot support the axially middle parts of the plurality of elastic members.

In view of this, according to the present damper device, the intermediate member is composed of the first and second intermediate plates disposed to sandwich the flange of the second rotor. In this case, the plurality of elastic members can be compressed, while being evenly pressed by the flange, the first intermediate plate, and the second intermediate plate.

(4) Preferably, the first intermediate plate includes a first annular portion forming part of the annular portion and a first support portion forming part of the support portion. The first annular portion is disposed radially outside the plurality of elastic members. The first support portion is shaped to protrude radially inward from the first annular portion. Besides, the second intermediate plate includes a second annular portion forming part of the annular portion and a second support portion forming part of the support portion. The second annular portion is disposed radially outside the plurality of elastic members. The second support portion is shaped to protrude radially inward from the second annular portion.

In this case, the damper device further includes a first spacer and a second spacer. The first spacer is disposed axially between the first annular portion of the first intermediate plate and an outer peripheral part of the flange. The second spacer is disposed axially between the second annular portion of the second intermediate plate and the outer peripheral part of the flange.

Here, for realizing compactness in axial size of the damper device, it is required to reduce gaps between axially adjacent members as much as possible. On the other hand, for inhibiting unintended generation of hysteresis torque, it is required to avoid frictional contacts between members in parts other than the hysteresis generating mechanism. For thus reducing the gaps between members as much as possible and simultaneously avoiding the frictional contacts between those members, it is required to manage both machining of members and assembling of members with high accuracy.

In view of this, according to the present damper device, the first spacer is provided between the first intermediate plate and the flange, while the second spacer is provided between the second intermediate plate and the flange. When the spacers are each made thin and are each made of a member having a small friction coefficient, unintended generation of hysteresis torque can be inhibited, and simultaneously, compactness in axial size of the damper device can be achieved without managing both machining of members and assembling of members with high accuracy.

(5) Preferably, the friction member includes a first friction plate and a second friction plate. The first friction plate is disposed between the first input plate and the flange. The second friction plate is disposed between the second input plate and the flange.

(6) Preferably, the first rotor includes a plurality of holding portions each having a circular-arc shape, whereas the second rotor includes a plurality of accommodation portions. The plurality of holding portions hold the plurality of elastic members. The plurality of accommodation portions are provided in correspondence to the plurality of holding portions and accommodate the plurality of elastic members. Besides, at least two of the plurality of elastic members are actuated in series by the intermediate member, while accommodated by the plurality of accommodation portions and held by the plurality of holding portions.

(7) Preferably, the first rotor includes a plurality of cutouts and a plurality of stopper portions. The plurality of cutouts are provided radially outside circumferential end regions of the plurality of holding portions and each have a predetermined circumferential length. On the other hand, the plurality of stopper portions are provided in circumferentially corresponding positions to the plurality of cutouts and each have a predetermined circumferential length. The second rotor includes a protrusion. The protrusion protrudes radially outward from an outer peripheral surface of the flange and overlaps in an axial position with the plurality of stopper portions. Besides, the protrusion restricts an angle of the relative rotation between the first rotor and the second rotor by making contact with a circumferential end surface of one of the plurality of stopper portions.

Here, the plurality of stopper portions of the first rotor and the protrusion of the second rotor compose a stopper mechanism that restricts the angle of the relative rotation (torsion angle) between the first rotor and the second rotor. Here, in general, the plurality of holding portions of the first rotor are each wider in radial width at a circumferentially middle part thereof than at both ends thereof. Therefore, in the first rotor, parts located radially outside the circumferentially middle parts of the plurality of holding portions are each narrow in radial width. When these parts are provided with the cutouts and the stopper portions for the stopper mechanism, the first rotor is degraded in rotational strength.

In view of this, according to the present damper device, the cutouts and the stopper portions are provided radially outside the circumferentially end regions of the plurality of holding portions. Because of this, degradation in rotational strength of the first rotor can be inhibited from being caused by the holding portions and the cutouts (stopper portions).

Overall, according to the present invention described above, a hysteresis generating mechanism, used for a type of damper device actuated in parallel, is made compatible to a serialized type of damper device.

DETAILED DESCRIPTION

[Entire Configuration]

Figure 1:
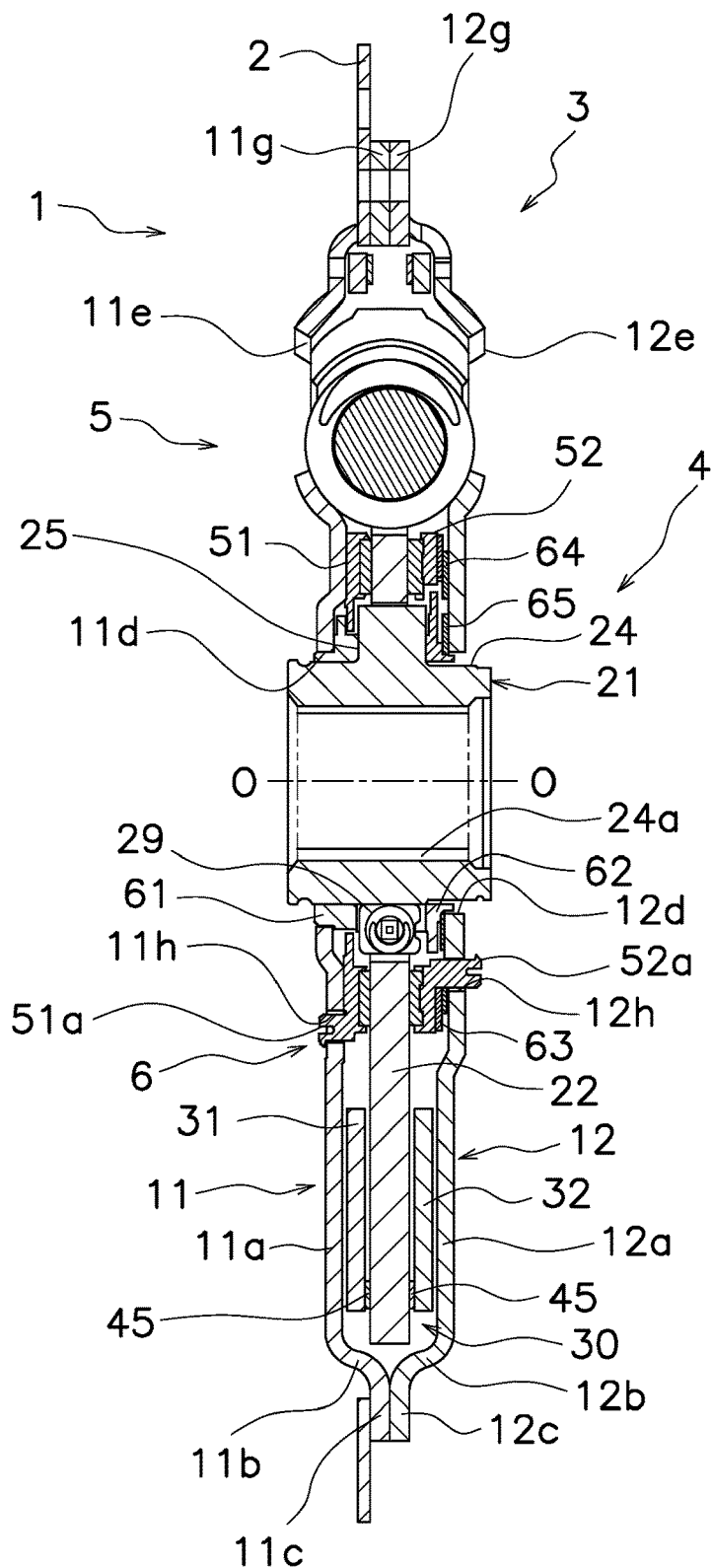
FIG. 1 is a cross-sectional view of a damper device according to a preferred embodiment of the present invention.
Figure 2:
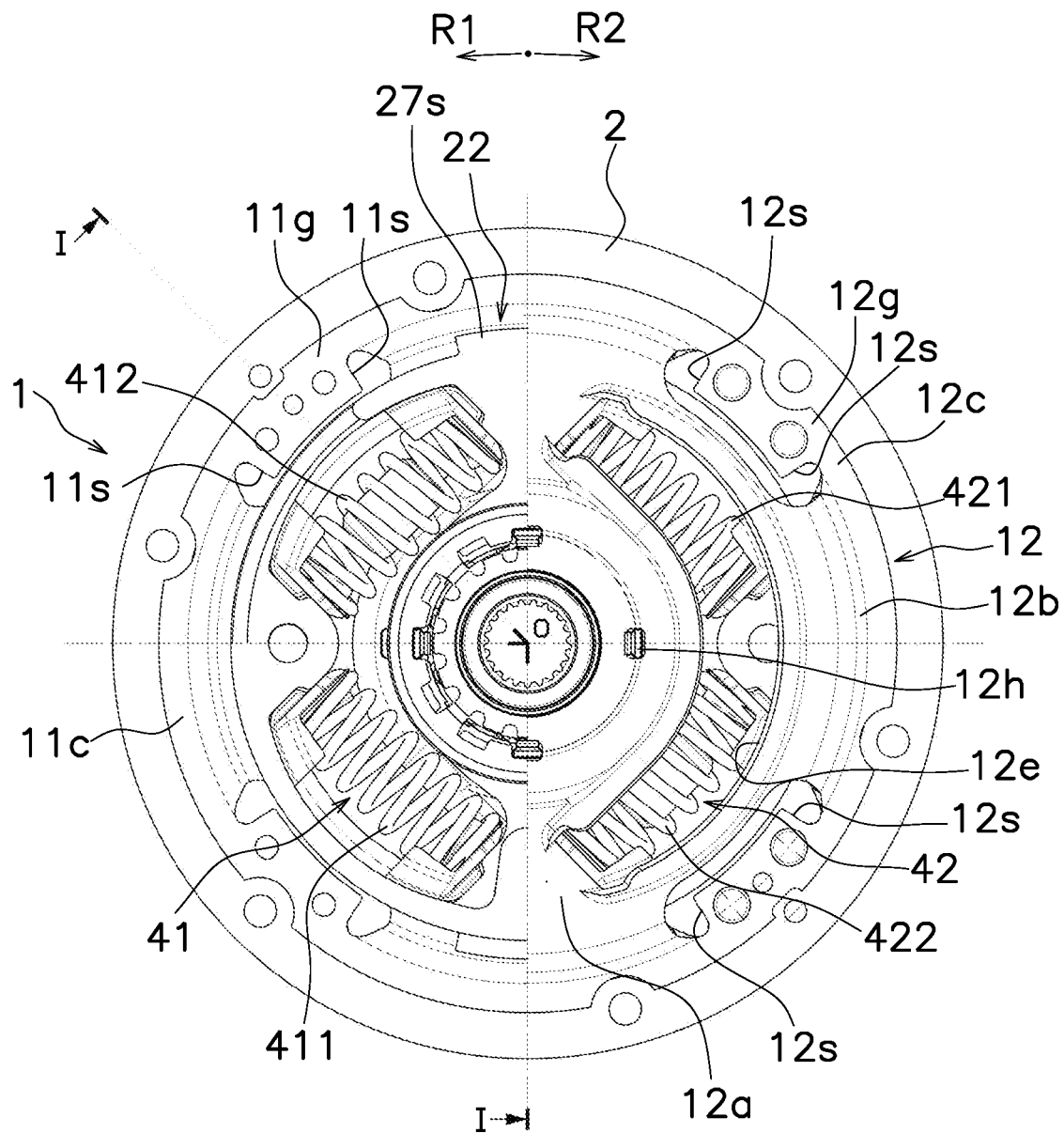
FIG. 2 is a front view of the damper device.

FIG. 1 is a cross-sectional view of a damper device 1 according to a preferred embodiment of the present invention and is taken along line I-I in FIG. 2. On the other hand, FIG. 2 is a front view of the damper device 1, from part of which some constituent members are detached. In FIG. 1, a drive source is disposed on the left side of the damper device 1, whereas a transmission and so forth are disposed on the right side of the damper device 1.

It should be noted that in the following explanation, the term "axial direction" refers to an extending direction of a rotational axis O of the damper device 1. On the other hand, the term "circumferential direction" refers to a circumferential direction of an imaginary circle about the rotational axis O, whereas the term "radial direction" refers to a radial direction of the imaginary circle about the rotational axis O. It should be noted that the circumferential direction is not required to be perfectly matched with that of the imaginary circle about the rotational axis O. Likewise, the radial direction is not required to be perfectly matched with a diameter direction of the imaginary circle about the rotational axis O.

The damper device 1 is a device for attenuating fluctuations in rotation inputted from the drive source. The damper device 1 includes a drive plate 2, an input-side plate 3 (exemplary first rotor), a hub flange 4 (exemplary second rotor), an elastic coupling part 5, and a hysteresis generating mechanism 6.

<Input-Side Plate 3>

The input-side plate 3 includes a first input plate 11 and a second input plate 12. The first and second input plates 11 and 12 are disc members each having a substantially annular shape. The first and second input plates 11 and 12 are disposed at a predetermined interval in the axial direction. The first and second input plates 11 and 12 are shaped in axially symmetric manner and the basic configurations thereof are the same. The first input plate 11 will be hereinafter explained in detail.

Figure 3:
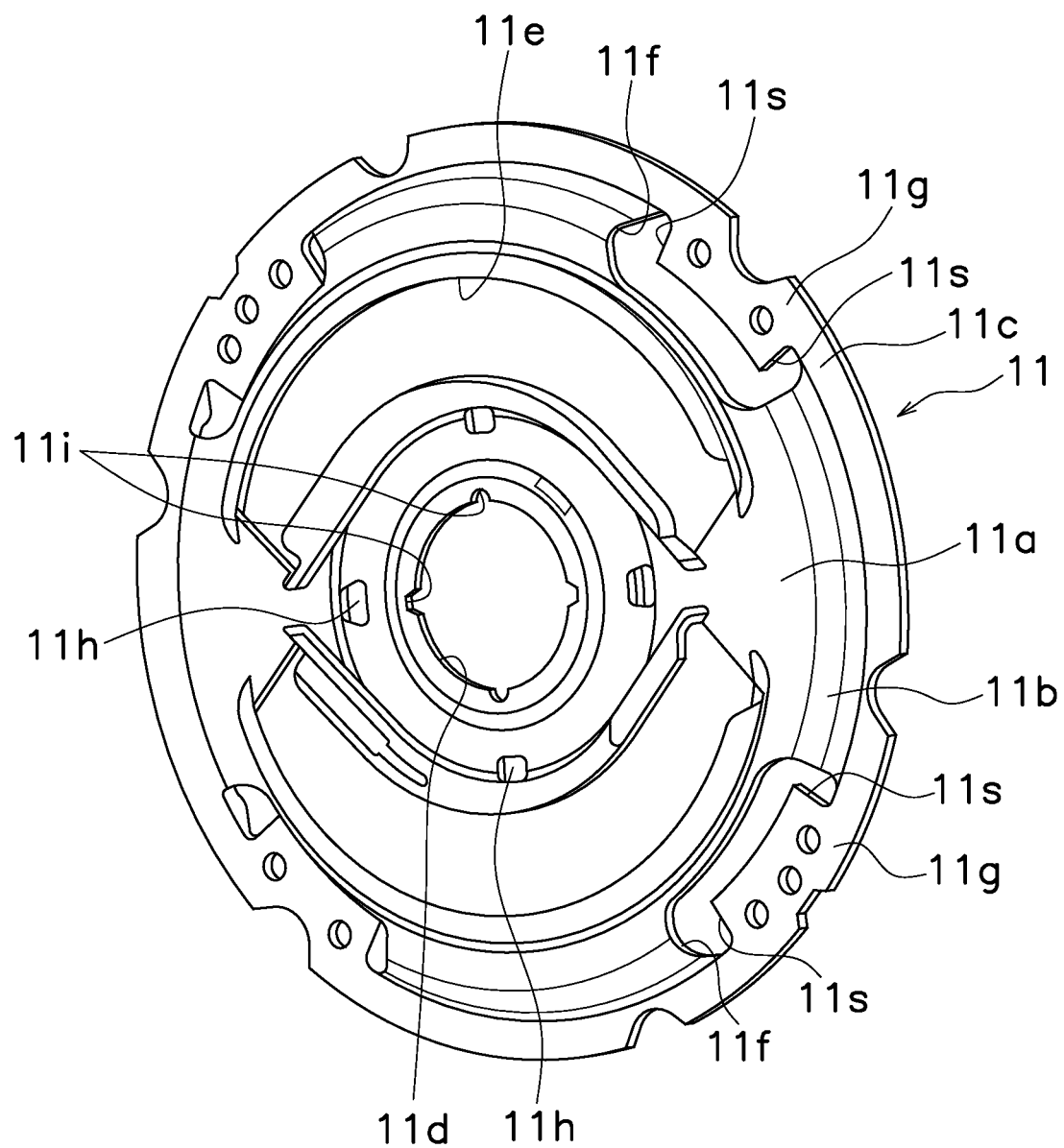
FIG. 3 is an external perspective view of a first input plate.

As shown in FIGS. 1 to 3, the first input plate 11 includes a disc portion 11a, a tubular portion 11b, and an outer peripheral extending portion 11c. It should be noted that FIG. 3 is an external perspective view of the first input plate 11. The disc portion 11a includes an opening 11d having a circular shape in a center part thereof. The tubular portion 11b axially extends from the outer peripheral end of the disc portion 11a toward the second input plate 12. The outer peripheral extending portion 11c extends radially outward from the axial distal end of the tubular portion 11b.

Besides, the disc portion 11a is provided with two window portions 11e (exemplary holding portions) each having a circular-arc shape in a radially intermediate part thereof. The window portions 11e are radially opposed to each other. Moreover, each window portion 11e is wider in radial width at a circumferentially middle part thereof than at both ends thereof. In other words, distance between the outer peripheral surface of each window portion 11e and that of the first input plate 11 is smaller at the middle part of each window portion 11e than at both ends of each window portion 11e.

Furthermore, as is obvious from FIGS. 2 and 3, four cutouts 11f are provided in the tubular portion 11b and an outer peripheral part of the disc portion 11a so as to be disposed radially outside both ends of the window portions 11e. Each cutout 11f has a predetermined length in the circumferential direction.

The outer peripheral extending portion 11c is provided in part with four fixation portions 11g (exemplary stopper portions). The fixation portions 11g are disposed in corresponding positions to the cutouts 11f in the circumferential direction. In more detail, when the cutouts 11 are punched out by stamping, the fixation portions 11g are simultaneously formed therewith. The circumferential end surfaces of each fixation portion 11g are herein obtained as stopper surfaces 11s.

As described above, the second input plate 12 has basically the same configuration as the first input plate 11, and hence, includes a disc portion 12a, a tubular portion 12b, an outer peripheral extending portion 12c, an opening 12d, window portions 12e, cutouts 12f, fixation portions 12g, and stopper surfaces 12s. Besides, the first and second input plates 11 and 12 are coupled to each other by a plurality of rivets (not shown in the drawings) penetrating the fixation portions 11g and 12g so as to be unitarily rotatable together with the drive plate 2.

It should be noted that as shown in FIG. 3, the first input plate 11 is provided with four engaging holes 11h disposed radially inside the window portions 11e and is also provided with four cutouts 11i opened radially inward on the inner peripheral end surface thereof. On the other hand, the second input plate 12 is provided with a plurality of (four) engaging holes 12h in an inner peripheral end part thereof <Hub Flange 4>

Figure 4:
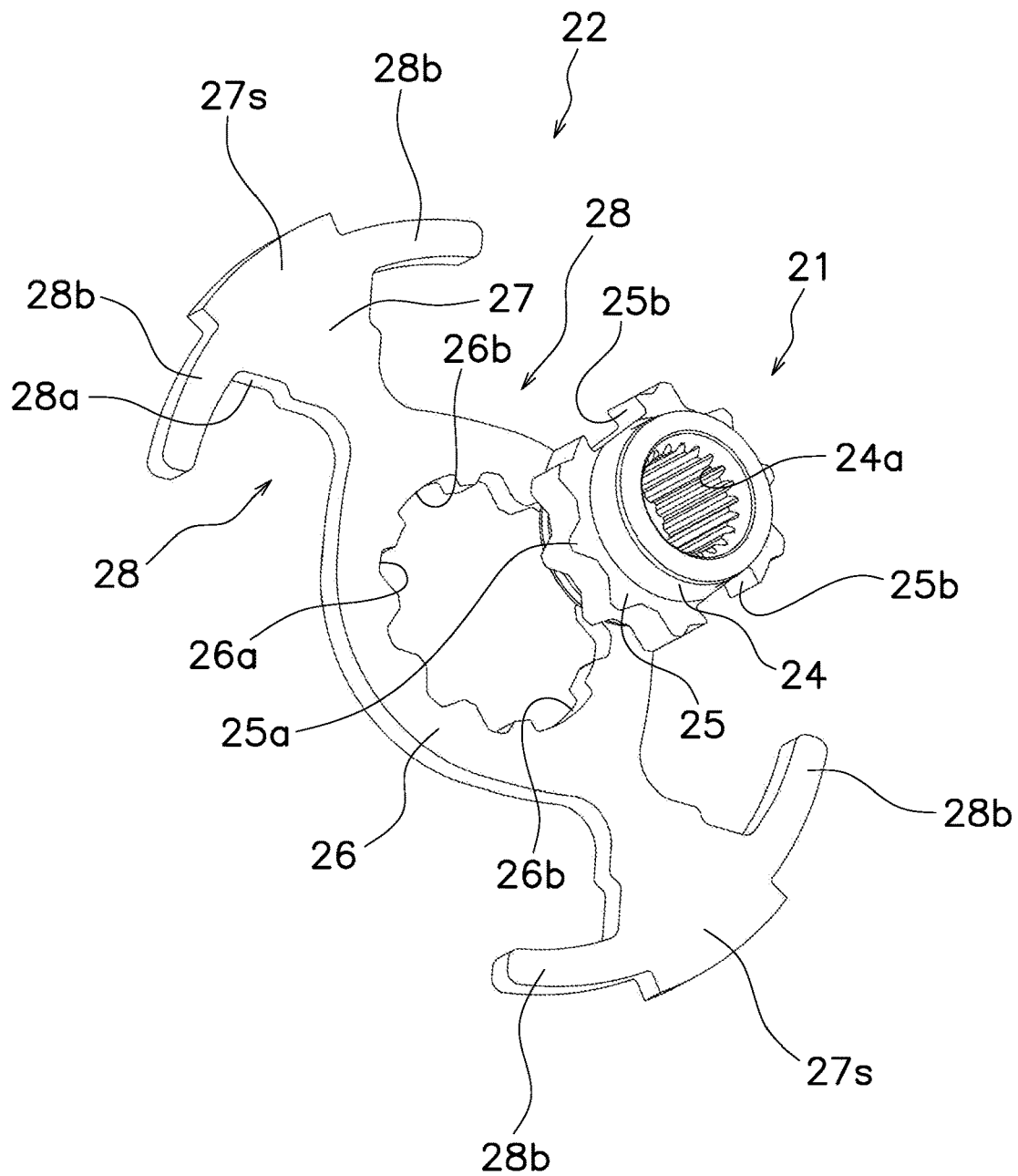
FIG. 4 is an exploded perspective view of a hub flange.

As shown in FIGS. 1, 2, and 4, the hub flange 4 includes a hub 21 and a flange 22. It should be noted that FIG. 4 is an exploded perspective view of the hub flange 4. The hub flange 4 is rotatable relative to the first and second input plates 11 and 12 (hereinafter referred to as "the input-side plate 3" on an as-needed basis) in a predetermined angular range.

—Hub 21—

The hub 21 includes a tubular portion 24 and a disc portion 25. The tubular portion 24 is provided with a spline hole 24a as the inner peripheral surface thereof. Besides, the tubular portion 24 penetrates the openings 11d and 12d provided in the center parts of the first and second input plates 11 and 12. The disc portion 25 is shaped to protrude radially outward from an axial middle part of the tubular portion 24. The disc portion 25 is provided with a plurality of teeth 25a and two cutouts 25b. The two cutouts 25b are opposed to each other with respect to the rotational axis O and are opened radially outward.

—Flange 22—

The flange 22 is disposed radially outside the disc portion 25 of the hub 21, while overlapping in an axial position with the disc portion 25. The flange 22 includes a disc portion 26, a pair of protruding portions 27, and a pair of output-side accommodation portions 28.

The disc portion 26 has an annular shape and is provided with a plurality of engaging portions 26a and two cutouts 26b on the inner peripheral surface thereof. The teeth 25a of the hub 21 are meshed with the engaging portions 26a through predetermined gaps. The two cutouts 26b are opposed to each other with respect to the rotational axis O. The two cutouts 26b are opposed to the cutouts 25b of the hub 21 and are opened radially inward.

Springs 29 (see FIG. 1) are disposed in spaces formed by pairs of cutouts 25b and 26b of the hub 21 and the flange 22. The springs 29 elastically couple the hub 21 and the flange 22 in the circumferential direction. It should be noted that the springs 29 are set to have smaller stiffness than the elastic coupling part 5.

In more detail, the hub 21 and the flange 22 are rotatable relative to each other by a rotation angle corresponding to the gap between each tooth 25a of the hub 21 and each engaging portion 26a of the flange 22. The springs 29 are actuated in a range of the rotation angle. Now, when torsion (relative rotation) is caused between the hub 21 and the flange 22 by the angle corresponding to the gap described above, each tooth 25a makes contact with the wall surface of each engaging portion 26a. Thereafter, relative rotation is prevented between the hub 21 and the flange 22, whereby both members 21 and 22 are unitarily rotated.

The pair of protruding portions 27 is shaped to protrude radially outward from the outer peripheral surface of the disc portion 26 and is opposed to each other with respect to the rotational axis O. Each protruding portion 27 is provided with a stopper protrusion 27s protruding radially outward from the outer peripheral surface thereof. The stopper protrusions 27s are provided in positions axially overlapping the fixation portions 11g and 12g of the input-side plate 3. Therefore, when each stopper protrusion 27s makes contact with one-side stopper surface 11s, 12s, which is one of both end surfaces of the fixation portion 11g, 12g adjacent thereto, the hub flange 4 is prevented from rotating relative to the input-side plate 3. In other words, the stopper surfaces 11s and 12s and each stopper protrusion 27s compose a stopper mechanism.

The pair of output-side accommodation portions 28 is provided circumferentially between the pair of protruding portions 27. Each output-side accommodation portion 28 includes end surface support portions 28a and outer peripheral support portions 28b. Each end surface support portion 28a is one of circumferential end surfaces of each protruding portion 27. Each outer peripheral support portion 28b is shaped to extend from the outer peripheral end of each end surface support portion 28a to one of both sides in the circumferential direction by predetermined distance.

<Elastic Coupling Part 5>

Figure 5:
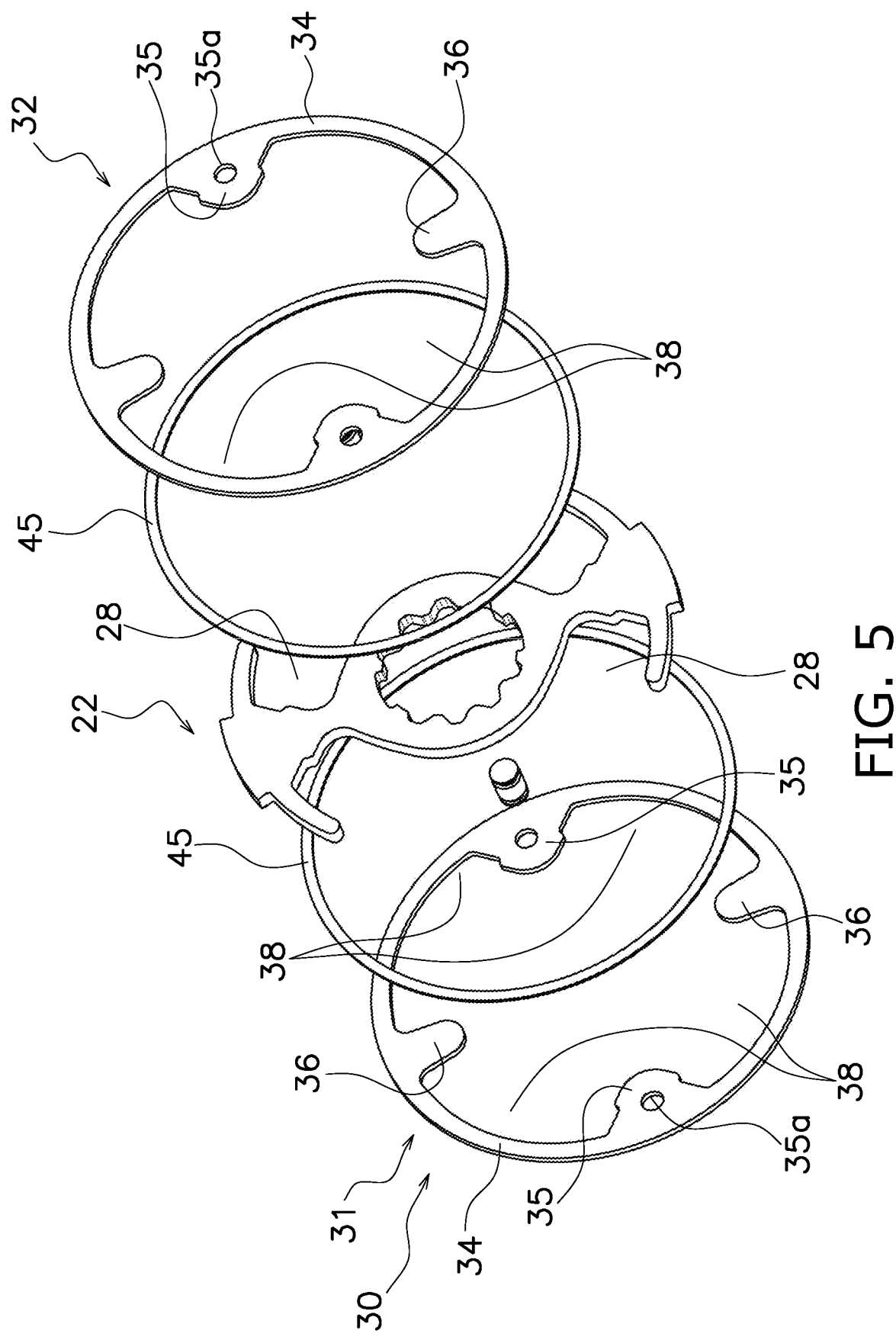
FIG. 5 is an exploded perspective view of a flange, an intermediate member, and spacers.

As shown in FIGS. 1 and 5, the elastic coupling part 5 includes first and second support plates 31 and 32 (exemplary first and second intermediate plates), both of which compose an intermediate member 30, a first spring set 41, a second spring set 42, and a pair of spacers 45. The elastic coupling part 5 elastically couples the input-side plate 3 and the hub flange 4 in the rotational direction.

—Intermediate Member 30 (Support Plates 31 and 32)—

The first support plate 31 is disposed axially between the first input plate 11 and the flange 22. The second support plate 32 is disposed axially between the second input plate 12 and the flange 22. The first and second support plates 31 and 32 are fixed to each other in both axial and rotational directions. Besides, both support plates 31 and 32 are rotatable relative to the input-side plate 3 and the hub flange 4.

The first and second support plates 31 and 32 are configured in similar manner. Hence, in the following explanation, each support plate 31, 32 will be referred to as "the intermediate member 30" on an as-needed basis.

The intermediate member 30 includes an annular portion 34, two support portions 35, and two protruding portions 36 for reinforcement purpose. The annular portion 34 continues in the circumferential direction. The two support portions 35 are opposed to each other with respect to the rotational axis O and are shaped to protrude radially inward from the annular portion 34 by predetermined distance. Each support portion 35 is provided with a hole 35a for fixation purpose. The first and second support plates 31 and 32 are fixed to each other by rivets penetrating the holes 35a of the support portions 35. The two protruding portions 36 are disposed apart from the two support portions 35 at angular intervals of 90 degrees. The protruding portions 36 are shaped to protrude radially inward from the annular portion 34 by approximately the same distance as the support portions 35, whereby degradation in strength of each support plate 31, 32 is inhibited.

Besides, two spaces are produced circumferentially between the two protruding portions 36 as a pair of intermediate accommodation portions 38. The pair of intermediate accommodation portions 38 is disposed in corresponding positions to the pair of window portions 11e, 12e of the input-side plate 3 and the pair of output-side accommodation portions 28 of the flange 22. The pair of intermediate accommodation portions 38 accommodate the first spring set 41 and the second spring set 42 (see FIG. 2), respectively.

—Spring Sets 41 and 42—

The first and second spring sets 41 and 42 are accommodated in the output-side accommodation portions 28 of the flange 22 and the intermediate accommodation portions 38 of each first/second support plate 31, 32, respectively, while being held by the window portions 11e, 12e of the input-side plate 3, respectively. Each spring set 41, 42 includes an R1 spring 411, 421 disposed on a first side in the circumferential direction (hereinafter referred to as "R1 side") and an R2 spring 412, 422 disposed on a second side in the circumferential direction (hereinafter referred to as "R2 side").

Now, in a neutral condition without any angle of torsion between the input-side plate 3 and the hub flange 4, in each spring set 41, 42, the R1 spring 411, 421 makes contact at the R1-side end surface thereof with the R1-side end surface of each window portion 11e, 12e and that of each output-side accommodation portion 28, while making contact at the R2-side end surface thereof with each support portion 35 of each support plate 31, 32. On the other hand, the R2 spring 412, 422 makes contact at the R1-side end surface thereof with each support portion 35 of each support plate 31, 32, while making contact at the R2-side end surface thereof with the R2-side end surface of each window portion 11e, 12e and that of each output-side accommodation portion 28.

With the springs 411, 412, 421, and 422 disposed as described above and both support plates 31 and 32, when torsion is caused between the input-side plate 3 and the hub flange 4, the R1 spring 411 and the R2 spring 412 of the first spring set 41 are actuated in series, while the R1 spring 421 and the R2 spring 422 of the second spring set 42 are actuated in series. On the other hand, the first and second spring sets 41 and 42 are actuated in parallel.

—Spacers 45—

The pair of spacers 45 is each disposed axially between the annular portion 34 of each first/second support plate 31, 32 and the outer peripheral part of the flange 22. Each spacer 45 is made in shape of an annulus having a predetermined radial width and is made of a resin member having a small friction coefficient. The pair of spacers 45 is each interposed between each support plate 31, 32 and the outer peripheral part of the flange 22, while in contact therewith. However, the pair of spacers 45 is freely rotatable.

With the pair of spacers 45 provided herein, it is enabled to avoid a situation that an unintended hysteresis torque is generated by direct contact between each support plate 31, 32 and the flange 22. On the other hand, the spacers 45 and the respective members 31, 32, and 22 make contact by friction with each other, whereby hysteresis torques are generated by the frictional contacts. However, the hysteresis torques can be made small in magnitude because of the spacers 45 made of resin having a small friction coefficient.

<Hysteresis Generating Mechanism 6>

As shown in FIG. 1, the hysteresis generating mechanism 6 includes a first friction plate 51, a second friction plate 52, a first bushing 61, a second bushing 62, a support plate 63, an outer peripheral cone spring 64, and an inner peripheral cone spring 65.

The first friction plate 51 is disposed axially between the first input plate 11 and the flange 22. A resin member having an annular shape is fixed to the first friction plate 51 and makes contact with the flange 22. The first friction plate 51 is provided with a plurality of protrusions 51a protruding from the outer peripheral end thereof toward the first input plate 11. The protrusions 51a are engaged with the engaging holes 11h provided in the first input plate 11. Because of this, the first friction plate 51 is rotated in synchronization with the first input plate 11.

The first bushing 61 has an annular shape and is disposed on the inner peripheral side of the first friction plate 51, while being disposed between the first input plate 11 and the disc portion 25 of the hub 21. The first bushing 61 is provided with a plurality of protrusions protruding radially outward from the outer peripheral surface thereof. The protrusions are capable of making contact with part of the inner peripheral end of the first friction plate 51. The first bushing 61 is thereby restricted from moving toward the second input plate 12. It should be noted that the first bushing 61 and the first input plate 11 are engaged in part with each other. Because of this, the first bushing 61 is rotated in synchronization with the first input plate 11 and the first friction plate 51.

The second friction plate 52 is disposed axially between the second input plate 12 and the flange 22. A resin member having an annular shape is fixed to the second friction plate 52 and makes contact with the flange 22. The second friction plate 52 is provided with four protrusions 52a protruding from the inner peripheral end thereof toward the second input plate 12. The protrusions 52a are engaged with the engaging holes 12h provided in the second input plate 12. Because of this, the second friction plate 52 is rotated in synchronization with the second input plate 12.

The second bushing 62 has an annular shape and is disposed on the inner peripheral side of the second friction plate 52, while being disposed between the second input plate 12 and the disc portion 25 of the hub 21. The second bushing 62 is provided with a plurality of protrusions protruding radially outward from the outer peripheral surface thereof. The protrusions are engaged with part of the second friction plate 52. Accordingly, the second bushing 62 is rotated in synchronization with the second friction plate 52 and the second input plate 12.

The support plate 63 and the outer peripheral cone spring 64 are disposed axially between the second friction plate 52 and the second input plate 12. In more detail, the support plate 63 is disposed in contact with the second friction plate 52, while the outer peripheral cone spring 64 is disposed between the support plate 63 and the second input plate 12. The support plate 63 has an annular shape and the outer peripheral cone spring 64 presses the second friction plate 52 through the support plate 63 against the flange 22.

The inner peripheral cone spring 65 is disposed axially between the second bushing 62 and the second input plate 12. The second bushing 62 is pressed against the disc portion 25 of the hub 21 by the inner peripheral cone spring 65.

[Actions]

When an inputted torque is small in magnitude or fluctuation, only the springs 29 disposed between the hub 21 and the flange 22 are actuated. In other words, the input-side plate 3 and the flange 22 are unitarily rotated, whereas the flange 22 and the hub 21 are rotated relative to each other by the angle corresponding to the gap between each tooth 25a and each engaging portion 26a. Here, the first and second bushings 61 and 62 and the disc portion 25 of the hub 21 make contact by friction with each other, whereby hysteresis torques are generated.

When the angle of torsion between the flange 22 and the hub 21 increases with increase in fluctuation of torque, each tooth 25a and the wall surface of each engaging portion 26a makes contact with each other. Accordingly, actuation of the springs 29 are stopped, and hence, the hub 21 and the flange 22 are unitarily rotated. Then, relative rotation is caused between the input-side plate 3 and the hub flange 4, whereby the two springs 411 and 412 of the first spring set 41 are actuated in series by the intermediate member 30 (the first and second support plates 31 and 32), and likewise, the two springs 421 and 422 of the second spring set 42 are actuated in series by the intermediate member 30. On the other hand, the first and second spring sets 41 and 42 are actuated in parallel. In this condition, the first and second friction plates 51 and 52 are each rotated in synchronization with the input-side plate 3. Hence, both friction plates 51 and 52 and the flange 22 make contact by friction with each other. Therefore, hysteresis torques are generated by the frictional contacts.

It should be noted that when the angle of torsion between the input-side plate 3 and the hub flange 4 further increases, the stopper protrusions 27s provided on the outer peripheral surface of the flange 22 make contact with the stopper surfaces 11s and 12s of the input-side plate 3. Accordingly, relative rotation is prevented between the input-side plate 3 and the flange 22.

It should be noted that in the actions described above, the first and second support plates 31 and 32 and the flange 22 are rotated relative to each other. However, hysteresis torques generated therebetween can be made small, because each of the pair of spacers 45 is provided between each support plate 31, 32 and the flange 22.

Other Preferred Embodiments

The present invention is not limited to the preferred embodiment described above, and a variety of changes or modifications can be made without departing from the scope of the present invention.

(a) The number of spring sets is not limited to that in the preferred embodiment described above. Besides, the number of springs composing each spring set is not limited as well to that in the preferred embodiment described above.

(b) In the preferred embodiment described above, the hub flange 4 is divided into the hub 21 and the flange 22. However, the present invention is similarly applicable as well to a hub flange of an integrated type.

(c) In the preferred embodiment described above, each of the pair of spacers is provided between each of the support plates and the flange. However, it is also possible to omit the pair of spacers.

(d) The configuration of the hysteresis generating mechanism is not limited to that in the preferred embodiment described above. It is possible to similarly apply any suitable one of configurations of a variety of hysteresis generating mechanisms for versatile damper devices actuated in parallel as the configuration of the hysteresis generating mechanism.

REFERENCE SIGNS LIST

1 Damper device
3 Input-side plate (first rotor)
4 Hub flange (second rotor)
6 Hysteresis generating mechanism
11 First input plate
11e Window portion (holding portion)
11s Stopper surface
12 Second input plate
12e Window portion (holding portion)
12s Stopper surface
27s Stopper protrusion
28 Output-side accommodation portion
30 Intermediate member 31, 32 Support plate (intermediate member)
34 Annular portion
35 Support portion
41, 42 Spring set
411, 412, 421, 422 Spring (elastic member)
45 Spacer
51, 52 Friction plate

What is claimed is:

1. A damper device, comprising:
a first rotor;
a second rotor rotatable relative to the first rotor;
a plurality of elastic members circumferentially aligned, the plurality of elastic members configured to elastically couple the first rotor and the second rotor in a rotational direction;
an intermediate member disposed axially between the first rotor and the second rotor so as to be rotatable relative to the first rotor and the second rotor; and
a hysteresis generating mechanism disposed axially between the first rotor and the second rotor, the hysteresis generating mechanism configured to generate a hysteresis torque in relative rotation between the first rotor and the second rotor,
wherein the intermediate member includes an annular portion and a support portion,
the annular portion is provided radially outside the plurality of elastic members,
the support portion protrudes radially inward from the annular portion, the support portion disposed between at least circumferentially adjacent two of the plurality of elastic members, the support portion configured to actuate the at least circumferentially adjacent two of the plurality of elastic members in series,
the first rotor includes a first input plate and a second input plate, the first and second input plates each having a disc shape, the first and second input plates axially opposed to each other, the first and second input plates fixed to each other,
the second rotor includes a flange disposed axially between the first input plate and the second input plate, and
the intermediate member comprises
a first intermediate plate disposed axially between the first input plate and the flange, and
a second intermediate plate disposed axially between the second input plate and the flange, the second intermediate plate fixed to the first intermediate plate by a fastener at the support portion of the intermediate member so as to be immovable with respect thereto in both axial and rotational directions.

2. The damper device according to claim 1, wherein the hysteresis generating mechanism includes a friction member disposed axially between the first rotor and the second rotor, the friction member making contact at a first axially lateral surface thereof with the first rotor, the friction member making contact at a second axially lateral surface thereof with the second rotor.

3. The damper device according to claim 1, wherein the friction member includes a first friction plate and a second friction plate, the first friction plate disposed between the first input plate and the flange, the second friction plate disposed between the second input plate and the flange.

4. The damper device according to claim 1,
wherein the first rotor includes a plurality of holding portions each having a circular-arc shape, the plurality of holding portions holding the plurality of elastic members,
the second rotor includes a plurality of accommodation portions provided in correspondence to the plurality of holding portions, the plurality of accommodation portions accommodating the plurality of elastic members, and
at least two of the plurality of elastic members are actuated in series by the intermediate member, while accommodated by the plurality of accommodation portions and held by the plurality of holding portions.

5. The damper device according to claim 1,
wherein the first rotor includes a plurality of cutouts and a plurality of stopper portions, the plurality of cutouts provided radially outside circumferential end regions of the plurality of holding portions, the plurality of cutouts each having a predetermined circumferential length, the plurality of stopper portions provided in circumferentially corresponding positions to the plurality of cutouts, the plurality of stopper portions each having a predetermined circumferential length, and
the second rotor includes a protrusion protruding radially outward from an outer peripheral surface of the flange, the protrusion overlapping in an axial position with the plurality of stopper portions, the protrusion configured to restrict an angle of the relative rotation between the first rotor and the second rotor by making contact with a circumferential end surface of one of the plurality of stopper portions.

6. The damper device according to claim 1, wherein the fastener is a rivet.

7. A damper device, comprising:
a first rotor;
a second rotor rotatable relative to the first rotor;
a plurality of elastic members circumferentially aligned, the plurality of elastic members configured to elastically couple the first rotor and the second rotor in a rotational direction;
an intermediate member disposed axially between the first rotor and the second rotor so as to be rotatable relative to the first rotor and the second rotor;
a hysteresis generating mechanism disposed axially between the first rotor and the second rotor, the hysteresis generating mechanism configured to generate a hysteresis torque in relative rotation between the first rotor and the second rotor;
a first spacer; and
a second spacer,
wherein the intermediate member includes an annular portion and a support portion,
the annular portion is provided radially outside the plurality of elastic members,
the support portion protrudes radially inward from the annular portion, the support portion disposed between at least circumferentially adjacent two of the plurality of elastic members, the support portion configured to actuate the at least circumferentially adjacent two of the plurality of elastic members in series,
the hysteresis generating mechanism includes a friction member disposed axially between the first rotor and the second rotor, the friction member making contact at a first axially lateral surface thereof with the first rotor, the friction member making contact at a second axially lateral surface thereof with the second rotor,
the first rotor includes a first input plate and a second input plate, the first and second input plates each having a disc shape, the first and second input plates axially opposed to each other, the first and second input plates fixed to each other, the second rotor includes a flange disposed axially between the first input plate and the second input plate, the intermediate member includes
- a first intermediate plate disposed axially between the first input plate and the flange, and
- a second intermediate plate disposed axially between the second input plate and the flange, the second intermediate plate fixed to the first intermediate plate so as to be immovable with respect thereto in both axial and rotational directions, the first intermediate plate includes a first annular portion and a first support portion, the first annular portion forming part of the annular portion, the first annular portion disposed radially outside the plurality of elastic members, the first support portion forming part of the support portion, the first support portion protruding radially inward from the first annular portion, the second intermediate plate includes a second annular portion and a second support portion, the second annular portion forming part of the annular portion, the second annular portion disposed radially outside the plurality of elastic members, the second support portion forming part of the support portion, the second support portion protruding radially inward from the second annular portion, the first spacer is disposed axially between the first annular portion of the first intermediate plate and an outer peripheral part of the flange, and the second spacer is disposed axially between the second annular portion of the second intermediate plate and the outer peripheral part of the flange.

* * * * *